United States Patent
Miyoshi et al.

(10) Patent No.: US 6,637,639 B2
(45) Date of Patent: Oct. 28, 2003

(54) WIRE PROCESSING APPARATUS, FLUX APPLYING DEVICE, AND SOLDER DEPOSITING DEVICE

(75) Inventors: Akira Miyoshi, Hyogo (JP); Masahiro Ikeji, Hyogo (JP); Nobuo Satou, Hyogo (JP); Shigeru Sakaue, Hyogo (JP); Tadashi Taniguchi, Hyogo (JP)

(73) Assignee: ShinMaywa Industries, Ltd., Nishinomiya (JP)

( * ) Notice: Subject to any disclaimer, the term of this patent is extended or adjusted under 35 U.S.C. 154(b) by 0 days.

(21) Appl. No.: 10/012,317

(22) Filed: Dec. 12, 2001

(65) Prior Publication Data

US 2002/0092899 A1 Jul. 18, 2002

(30) Foreign Application Priority Data

Jan. 16, 2001 (JP) ........................... 2001-007950
Sep. 14, 2001 (JP) ........................... 2001-279743

(51) Int. Cl.[7] ................................................ B23K 1/08
(52) U.S. Cl. ................................. 228/40; 228/36
(58) Field of Search .............................. 228/248.1–262, 228/207, 214, 223, 4.5, 180.5, 33–41, 164, 165, 173.1, 173.2, 173.5

(56) References Cited

U.S. PATENT DOCUMENTS 3,680,762 A * 8/1972 Kondo ........................ 228/37
4,614,030 A * 9/1986 Lint et al. ................... 29/885
4,754,134 A * 6/1988 Ikeji et al. ................. 250/223 R
5,195,682 A * 3/1993 Rabinovich ............... 228/179.1
5,472,739 A * 12/1995 Kubota et al. ............... 427/319
5,472,740 A * 12/1995 Kubota et al. ............... 427/319
5,758,402 A * 6/1998 Asano et al. ............... 29/564.4

FOREIGN PATENT DOCUMENTS

JP          03077770 A  *  4/1991
JP          4-55788        5/1992
JP          09036528 A  *  2/1997

* cited by examiner

Primary Examiner—M. Alexandra Elve
Assistant Examiner—Colleen P Cooke
(74) Attorney, Agent, or Firm—Oblon, Spivak, McClelland, Maier & Neustadt, P.C.

(57) ABSTRACT

A wire processing apparatus includes an applicator (60) for crimping a crimp contact onto an end of a wire (2) and solder depositing units (7, 8) for depositing solder onto an exposed core on the wire end, all of which serve as wire processing units. The applicator (60) and the solder depositing units (7, 8) are attachable to and removable from a placement section (13a) and are interchangeable with each other. Each of the solder depositing units (7, 8) includes a flux bath (15) for storing a flux liquid therein, a solder bath (16) for storing solder in a molten state therein, and a flux liquid holding tube having a holding hole for holding the flux liquid therein and capable of releasably receiving the core. The core is moved downwardly into a solder portion raised by the surface tension of the solder stored in the solder bath 16, whereby the solder is deposited on the core.

16 Claims, 15 Drawing Sheets

WIRE PROCESSING APPARATUS, FLUX APPLYING DEVICE, AND SOLDER DEPOSITING DEVICE

BACKGROUND OF THE INVENTION

1. Field of the Invention

The present invention relates to a wire processing apparatus for performing predetermined processing on an end of an electric wire, a flux applying device, and a solder depositing device.

2. Description of the Background Art

Conventionally, examples of wire processing apparatuses for performing predetermined processing on an end of an electric wire include: a double-end wire terminating machine for performing a contact crimping process upon opposite ends of the wire; and a single-end wire solder-depositing and terminating machine for performing the contact crimping process upon one of the ends of the wire and performing a solder depositing process upon the other end thereof. These machines have been manufactured as individual types of machines.

The single-end wire solder-depositing and terminating machine differs from the double-end wire terminating machine in that a contact crimping unit placement section comprises a solder depositing unit (a solder bath, a flux bath, and the like) for depositing solder to a wire end as a final step after the removal of a covering from the wire end.

A conventionally typical solder depositing device is adapted to apply a flux liquid to a core on a wire end by inserting the core through an insertion hole formed in a side wall of a flux bath into the flux liquid being circulating in the flux bath, and thereafter apply solder to the core on the wire end by inserting the core into a flow of solder in a solder bath. Such a solder depositing device is disclosed, for example, in Japanese Utility Model Application Laid-Open No. 4-55788 (1992).

Unfortunately, the above-mentioned conventional wire processing apparatus presents problems. A purchaser must purchase a necessary machine type depending on applications and, hence, need to purchase both of the machine types in some cases. This requires a large space for installation.

The above-mentioned conventional solder depositing device is of the type in which the flux liquid is circulated or of the type in which solder is flowed, which poses the danger of leakage of liquid from the insertion hole formed in the side wall of the flux bath and also needs drive mechanisms for circulation, flowing and the like. This gives rise to the increase in the size of the flux bath and the solder bath and, accordingly, the increase in the size of the wire processing apparatus.

SUMMARY OF THE INVENTION

The present invention has been made to solve the above-mentioned problems. It is therefore an object of the present invention to provide a wire processing apparatus which achieves the size reduction of the entire apparatus and space savings.

It is another object of the present invention to provide a device having a flux bath which has a simplified structure, prevents leakage of liquid, and achieves the size reduction thereof.

It is still another object of the present invention to provide a device having a solder bath which has a simplified structure and achieves the size reduction thereof.

The present invention is intended for a wire processing apparatus. According to one aspect of the present invention, the wire processing apparatus comprises: moving means for moving a wire; and a wire processing unit installed on a placement section for performing processing on an end of the wire moved by the moving means, the wire processing unit including a contact crimping unit for crimping a crimp contact onto the end of the wire, and a solder depositing unit for depositing solder onto an exposed core on the end of the wire, wherein the contact crimping unit and the solder depositing unit are attachable to and removable from the placement section, and are exchangeable with each other.

In this aspect of the present invention, the contact crimping unit and the solder depositing unit are interchangeably installed on the single placement section in the wire processing apparatus. This eliminates the need to conventionally individually install a plurality of machine types, thereby to achieve the reduction in installation space and accordingly in the size of the entire apparatus.

According to a second aspect of the present invention, in the wire processing apparatus, each of the contact crimping unit and the solder depositing unit comprises an elevating section. The wire processing apparatus further comprises elevating means for upwardly and downwardly moving the elevating section of one of the contact crimping unit and the solder depositing unit which is installed on the placement section.

This makes the elevating means serve a double purpose.

According to a third aspect of the present invention, in the wire processing apparatus, the elevating means includes a press mechanism.

In the third aspect, a wire terminating machine may be readily used as a device for depositing solder on the core by making the solder depositing unit installable on the placement section of the contact crimping unit in the wire terminating machine.

According to a fourth aspect of the present invention, in the wire processing apparatus, the solder depositing unit comprises a solder bath for storing therein solder in a molten state to be deposited on the core; and the moving means moves downwardly to immerse the core in a solder portion raised by surface tension of the solder stored in the solder bath, whereby the solder is deposited on the core.

In the fourth aspect, the solder bath is only required to have a container structure capable of storing the solder in a molten state therein. The conventional solder flowing structure is not needed. This achieves a simplified structure of the solder bath and the size reduction thereof.

According to a fifth aspect of the present invention, in the wire processing apparatus, the elevating section of the solder depositing unit comprises a wire presser guide positioned over the solder bath in which the core is to be immersed, the wire presser guide having a presser surface for moving downwardly to downwardly press the core immersed in the solder portion raised by surface tension of the solder; and the moving means moves backward to draw the core pressed by the presser surface out of the raised solder portion, whereby the solder is deposited on the core.

This provides the solder deposited in a better state on the core.

According to a sixth aspect of the present invention, in the wire processing apparatus, the solder depositing unit comprises a flux bath for storing therein a flux liquid to be applied to the core; and the elevating section of the solder depositing unit comprises a flux liquid holding tube supported by the elevating section of the solder depositing unit vertically movably between a raised position lying over the flux bath and a lowered position lying in the flux liquid, the flux liquid holding tube having a holding hole for holding the flux liquid therein and capable of releasably receiving the core therein.

In the sixth aspect, the flux bath is only required to have a container structure capable of storing the flux liquid therein. There is no need to provide the conventional flux liquid circulation structure and the conventional insertion hole in the side wall of the flux bath. This achieves a simplified structure of the flux bath, effective prevention of liquid leakage, and size reduction of the flux bath itself.

According to a seventh aspect of the present invention, in the wire processing apparatus, an end of the holding hole of the flux liquid holding tube for insertion of the core therefrom has a tapered insertion guide surface gradually flared outwardly.

In the seventh aspect, the guide function of the insertion guide surface allows the stable insertion of the core into the holding hole.

According to an eighth aspect of the present invention, in the wire processing apparatus, the elevating section of the solder depositing unit further comprises a support rod having a lower end for supporting the flux liquid holding tube and the wire presser guide. When the support rod is in a raised position, the flux liquid holding tube is in the raised position lying over the flux bath, and the wire presser guide is positioned over the solder bath with the core immersed in the solder portion raised by the surface tension of the solder. When the support rod is in a lowered position, the flux liquid holding tube is in the lowered position lying in the flux liquid, and the presser surface of the wire presser guide downwardly presses the core immersed in the solder portion raised by the surface tension of the solder.

In the eighth aspect, the flux liquid holding tube and the wire presser guide are integrally moved upwardly and downwardly. This improves operation efficiency.

According to a ninth aspect of the present invention, in the wire processing apparatus, the solder depositing unit further comprises a film removal mechanism for removing an oxide film formed on a surface of the solder stored in the solder bath.

In the ninth aspect, the solder depositing process is performed with the solder surface held in a constantly good state in the solder bath.

The present invention is also intended for a flux applying device for applying a flux liquid to an exposed core on an end of a wire. According to one aspect of the present invention, the flux applying device comprises: a flux bath for storing the flux liquid therein; a flux liquid holding tube supported vertically movably between a raised position lying over the flux bath and a lowered position lying in the flux liquid, the flux liquid holding tube having a holding hole for holding the flux liquid therein; and moving means for movably supporting the wire and for releasably inserting the core into the holding hole of the flux liquid holding tube lying in the raised position.

In this aspect, the flux bath is only required to have a container structure capable of storing the flux liquid therein. There is no need to provide the conventional flux liquid circulation structure and the conventional insertion hole in the side wall of the flux bath. This achieves a simplified structure of the flux bath, effective prevention of liquid leakage, and size reduction of the flux bath itself.

According to another aspect of the present invention, in the flux applying device, an end of the holding hole of the flux liquid holding tube for insertion of the core therefrom has a tapered insertion guide surface gradually flared outwardly.

In this aspect, the guide function of the insertion guide surface allows the stable insertion of the core into the holding hole.

The present invention is also intended for a solder depositing device for depositing solder onto an exposed core on an end of a wire. According to one aspect of the present invention, the solder depositing device comprises: a solder bath for storing the solder in a molten state therein; and moving means for movably supporting the wire and for moving downwardly to immerse the core in a solder portion raised by surface tension of the solder stored in the solder bath, thereby causing the solder to be deposited onto the core.

In this aspect, the solder bath is only required to have a container structure capable of storing the solder in a molten state therein. The conventional solder flowing structure is not needed. This achieves a simplified structure of the solder bath and the size reduction thereof.

According to another aspect of the present invention, the solder depositing device further comprises a vertically movable wire presser guide positioned over the solder bath into which the core is to be immersed, the wire presser guide having a presser surface for moving downwardly to downwardly press the core immersed in the solder portion raised by the surface tension of the solder, wherein the moving means moves backward to draw the core pressed by the presser surface out of the raised solder portion, whereby the solder is deposited on the core.

This provides the solder deposited in a better state on the core.

The present invention is also intended for a solder depositing device for depositing solder onto an exposed core of a short length on an end of a wire. According to the present invention, the solder depositing device comprises: a solder bath for storing the solder in a molten state therein; moving means for movably supporting the wire with the core positioned over the solder bath; and a wire presser guide disposed vertically movably over the wire with the core positioned over the solder bath, the wire presser guide moving downwardly to press the wire downwardly, thereby immersing the core into the solder, wherein sad moving means moves backward to draw the core out of the solder.

This solder depositing device can perform a good solder depositing process also on the exposed core having a short length. Additionally, the solder bath is only required to have a container structure capable of storing the solder in a molten state therein. The conventional solder flowing structure is not needed. This achieves a simplified structure of the solder bath and the size reduction thereof.

The present invention is also intended for a solder depositing device which comprises: a flux bath for storing therein a flux liquid to be applied to an exposed core on an end of a wire; a solder bath for storing therein solder in a molten state to be deposited on the core; moving means for supporting the wire, the moving means being movable so as to cause the flux liquid to be applied to the core in a position of the flux bath and to cause the solder to be deposited on the core in a position of the solder bath; a support rod operated to move upwardly and downwardly; a flux liquid holding tube supported by a lower end of the support rod vertically movably between a first raised position lying over the flux bath and a first lowered position lying in the flux liquid, the flux liquid holding tube having a holding hole for holding the flux liquid therein and capable of releasably receiving the core therein; and a wire presser guide having a presser surface, the wire presser guide being supported by the lower end of the support rod and positioned over the solder bath with the core immersed in a solder portion raised by surface tension of the solder when the support rod is in a second raised position in which the flux liquid holding tube is in the first raised position, the presser surface downwardly pressing the core immersed in the solder when the support rod is in a second lowered position in which the flux liquid holding tube is in the first lowered position.

In this solder depositing device, the flux liquid holding tube and the wire presser guide are integrally moved upwardly and downwardly. This improves operation efficiency.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
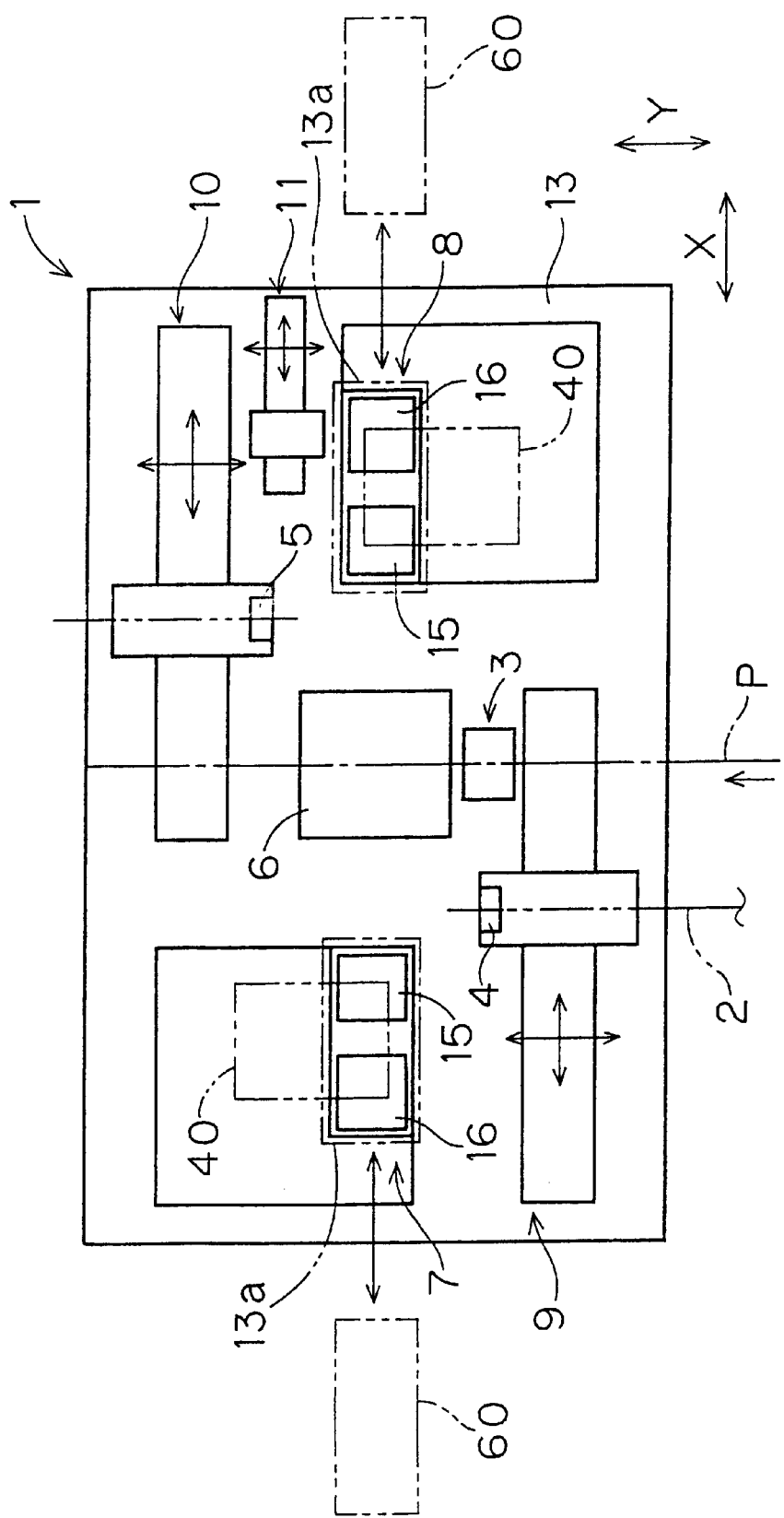
FIG. 1 is a general schematic view of one preferred embodiment according to the present invention.

A preferred embodiment according to the present invention will now be described with reference to the drawings. In FIG. 1, the reference numeral 1 designates a wire processing apparatus which comprises: a length measuring unit 3 for measuring out a predetermined length of an electric wire 2 being fed along a wire feed line P; a front clamp 4 and a rear clamp 5 for releasably gripping the wire 2; a cutter unit 6 for cutting and stripping the wire 2; a front solder depositing unit 7; a rear solder depositing unit 8; a front moving means 9 for transporting the wire 2 gripped by the front clamp 4 to a predetermined position; a rear moving means 10 for transporting the wire 2 gripped by the rear clamp 5 to a predetermined position; and a discharge unit 11 for discharging the processed wire 2.

The length measuring unit 3 comprises a wire delivery mechanism for sending out the wire 2 along the wire feed line P, and a length measuring mechanism for measuring the length of the wire 2 delivered by the wire delivery mechanism.

Each of the front solder depositing unit 7 and the rear solder depositing unit 8 comprises a flux bath 15 for storing a flux liquid therein and a solder bath 16 for storing molten solder therein.

The front clamp 4 is supported by the front moving means 9 provided on a pedestal 13. The front moving means 9 supports the front clamp 4 so that the front clamp 4 is movable in three axial directions X, Y, Z (although only the two axial directions X and Y are shown by arrows in FIG. 1) which are orthogonal to each other, that is, three-dimensionally in forward, backward, rightward, leftward, upward and downward directions. The front clamp 4 is movable between the positions of the length measuring unit 3 and the cutter unit 6, the position of the flux bath 15 in the front solder depositing unit 7, and the position of the solder bath 16 in the front solder depositing unit 7.

Similarly, the rear clamp 5 is supported by the rear moving means 10 provided on the pedestal 13. The rear moving means 10 supports the rear clamp 5 so that the rear clamp 5 is movable in the three axial directions X, Y, Z orthogonal to each other, that is, three-dimensionally in forward, backward, rightward, leftward, upward and downward directions. The rear clamp 5 is movable between the position of the cutter unit 6, the position of the flux bath 15 in the rear solder depositing unit 8, the position of the solder bath 16 in the rear solder depositing unit 8, and the position of the discharge unit 11.

The wire 2 delivered a predetermined length along the wire feed line P by the length measuring unit 3 is gripped by the front clamp 4 and the rear clamp 5. In this condition, the cutter unit 6 cuts the wire 2 into two parts: the wire 2 gripped by the front clamp 4 and the wire 2 gripped by the rear clamp 5. Thereafter, the cutter unit 6 strips off a covering from the ends of the wires 2 gripped by the clamps 4 and 5, respectively.

The wire 2 gripped by the front clamp 4 is then moved to the position of the flux bath 15 in the front solder depositing unit 7 where the flux liquid is applied to an exposed core of the wire 2. Thereafter, the wire 2 gripped by the front clamp 4 is moved to the position of the solder bath 16 where solder is applied to the core of the wire 2. After the solder depositing process, the wire 2 gripped by the front clamp 4 is returned to its initial position opposed to the cutter unit 6.

During the solder depositing process of the wire 2 gripped by the front clamp 4, the wire 2 gripped by the rear clamp 5 is subjected to the following processes. The wire 2 gripped by the rear clamp 5 is moved to the position of the flux bath 15 in the rear solder depositing unit 8 where the flux liquid is applied to an exposed core of the wire 2, and is thereafter moved to the position of the solder bath 16 where solder is applied to the core of the wire 2. The wire 2 is then transferred to the three-dimensionally movable discharge unit 11 and is discharged to a predetermined discharge section. The rear clamp 5 is returned to its initial position opposed to the cutter unit 6.

Next, the length measuring unit 3 operates to deliver the predetermined length of the wire 2 along the wire feed line P in the manner described above. Similar operation is repeatedly performed to manufacture successive harnesses of the predetermined wire length, with solder deposited on their opposite ends.

The front solder depositing unit 7 will be discussed since the front solder depositing unit 7 and the rear solder depositing unit 8 serving as a wire processing unit are similar in construction.

As illustrated also in FIGS. 2 through 7, the front solder depositing unit 7 comprises an upper unit 7a and a lower unit 7b. The flux bath 15 and the solder bath 16 are supported in side-by-side relation over a basal plate 17 of the lower unit 7b by support brackets 18, 19 and the like.

An appropriate amount of flux liquid 21 is stored in the flux bath 15. Molten solder 22 is stored in the solder bath 16, with the surface of the molten solder 22 raised by surface tension above the upper edge of the solder bath 16.

A dross receiver 23 is positioned adjacent to one side of the solder bath 16. A heater 24 for heating the solder 22 in the solder bath 16 to maintain the solder 22 in the molten state at a predetermined temperature is provided on the lower surface of the solder bath 16. A heat insulating plate 25 surrounds the side and bottom portions of the solder bath 16, the dross receiver 23 and the heater 24.

A film removal mechanism 27 for removing an oxide film formed on the surface of the solder 22 is provided on the basal plate 17. The film removal mechanism 27 comprises a sliding cylinder 29 fixedly mounted on the basal plate 17 by a support bracket 28, a support block 30 mounted to the forward end of a piston rod 29a of the sliding cylinder 29, and a shaft 31 rotatably journaled in an upper part of the support block 30.

A locating pin 33 is fixed to an extended end of a support arm 32 fixed to a protrusion on one end of the shaft 31. A film removal plate 37 is supported pivotably about a shaft 36 by a plate support 34 fixed to a protrusion on the other end of the shaft 31 under the biasing force of a tension spring 35.

Figure 2:
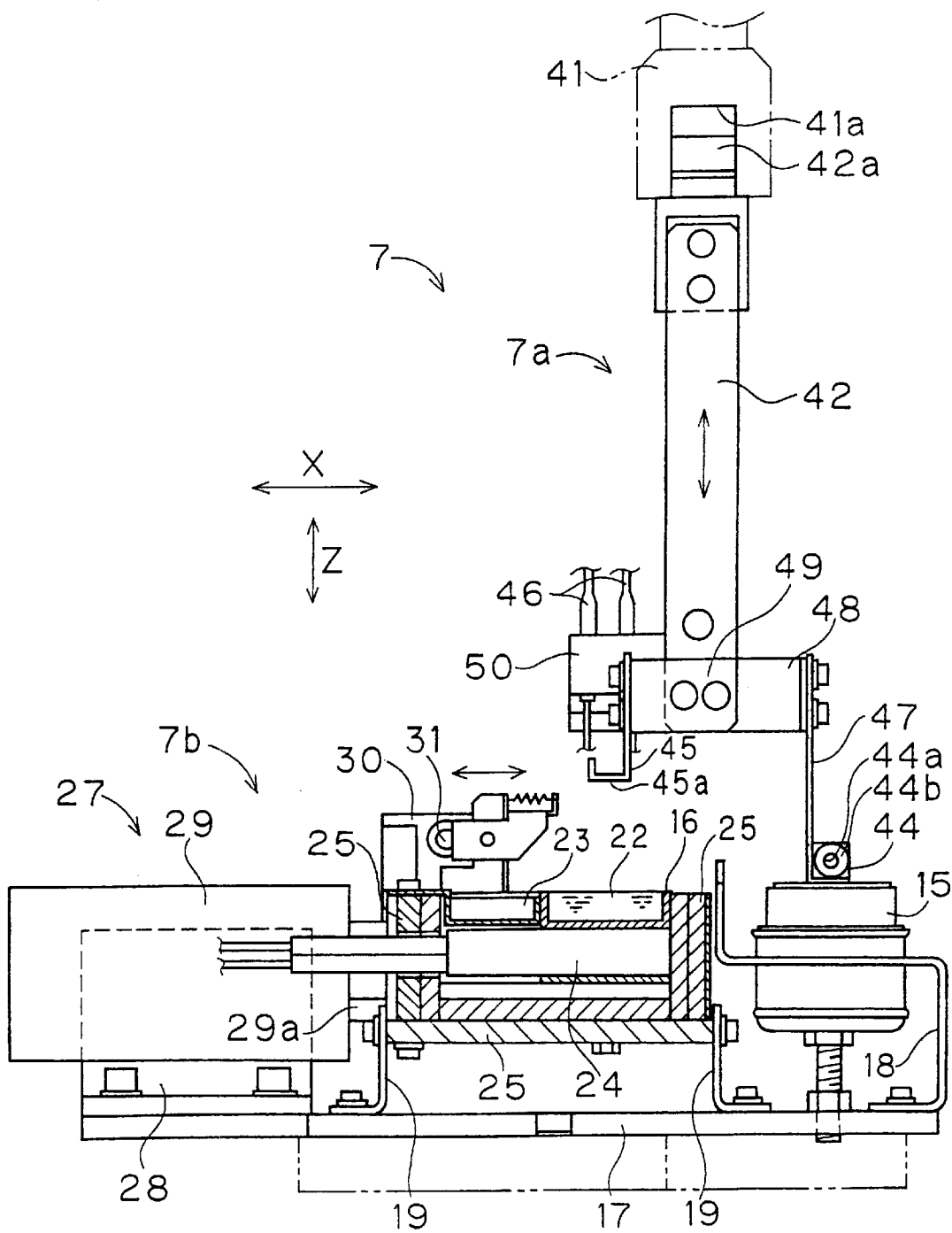
FIG. 2 is a front view, partially in cross-section, of a front solder depositing unit.
Figure 3:
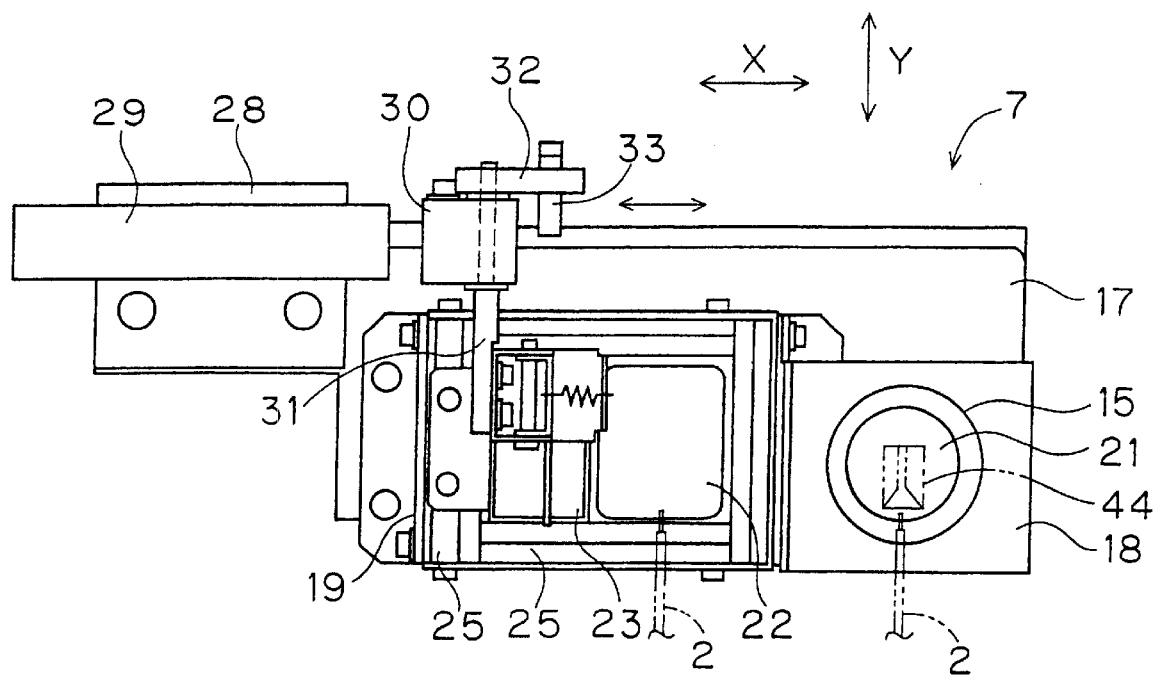
FIG. 3 is a plan view of a lower unit.
Figure 6:
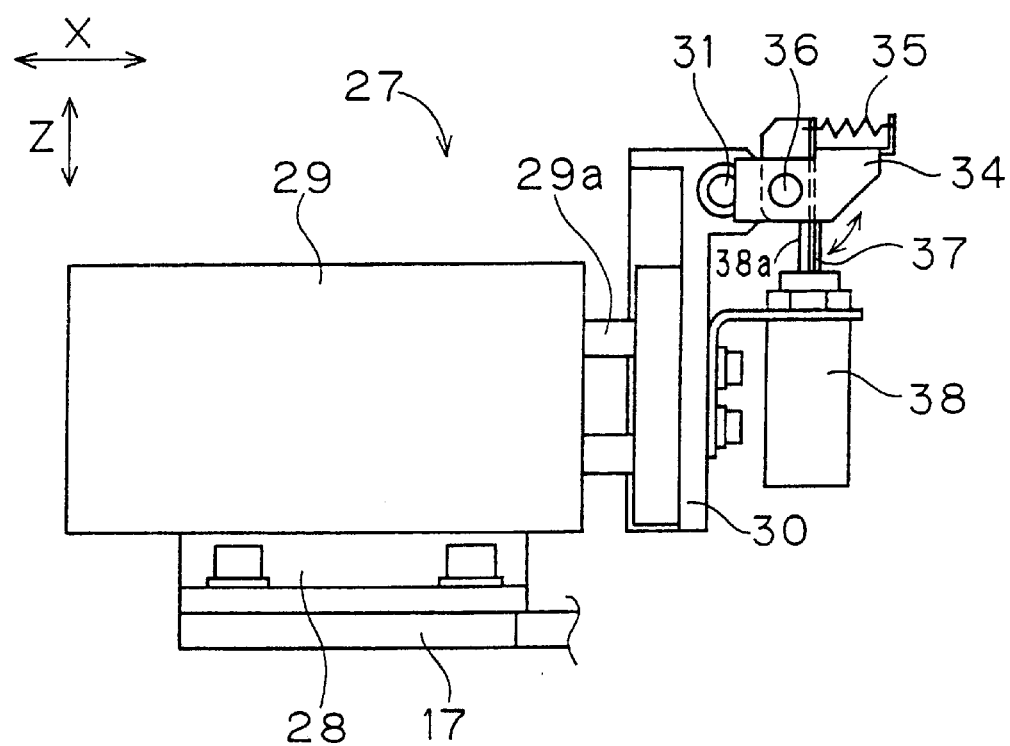
FIG. 6 is a front view of a film removal mechanism.
Figure 7:
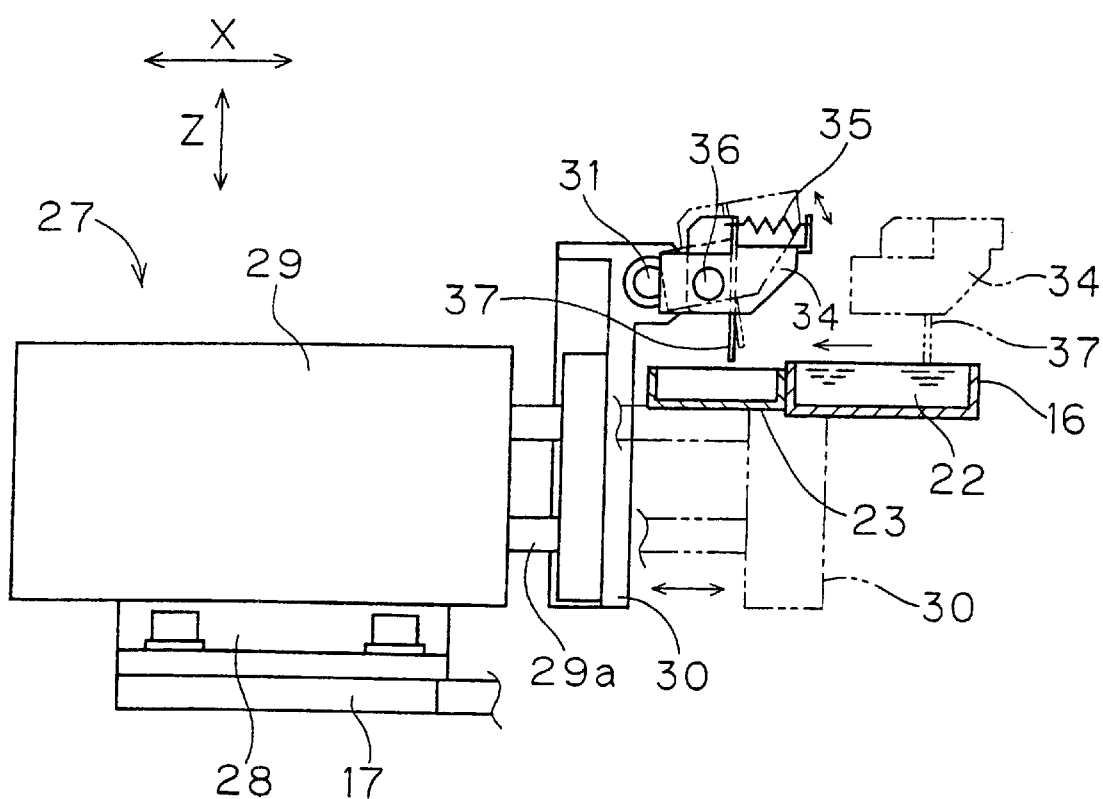
FIG. 7 is a view for illustrating the operation of the film removal mechanism.

A pivoting cylinder 38 is mounted to a vertically middle portion of the support block 30. The forward end of a piston rod 38a of the pivoting cylinder 38 is in abutment with the lower surface of the locating pin 33. In this initial state, the film removal plate 37 is adapted to assume a vertical position, as shown in FIGS. 2 and 6.

Figure 4:
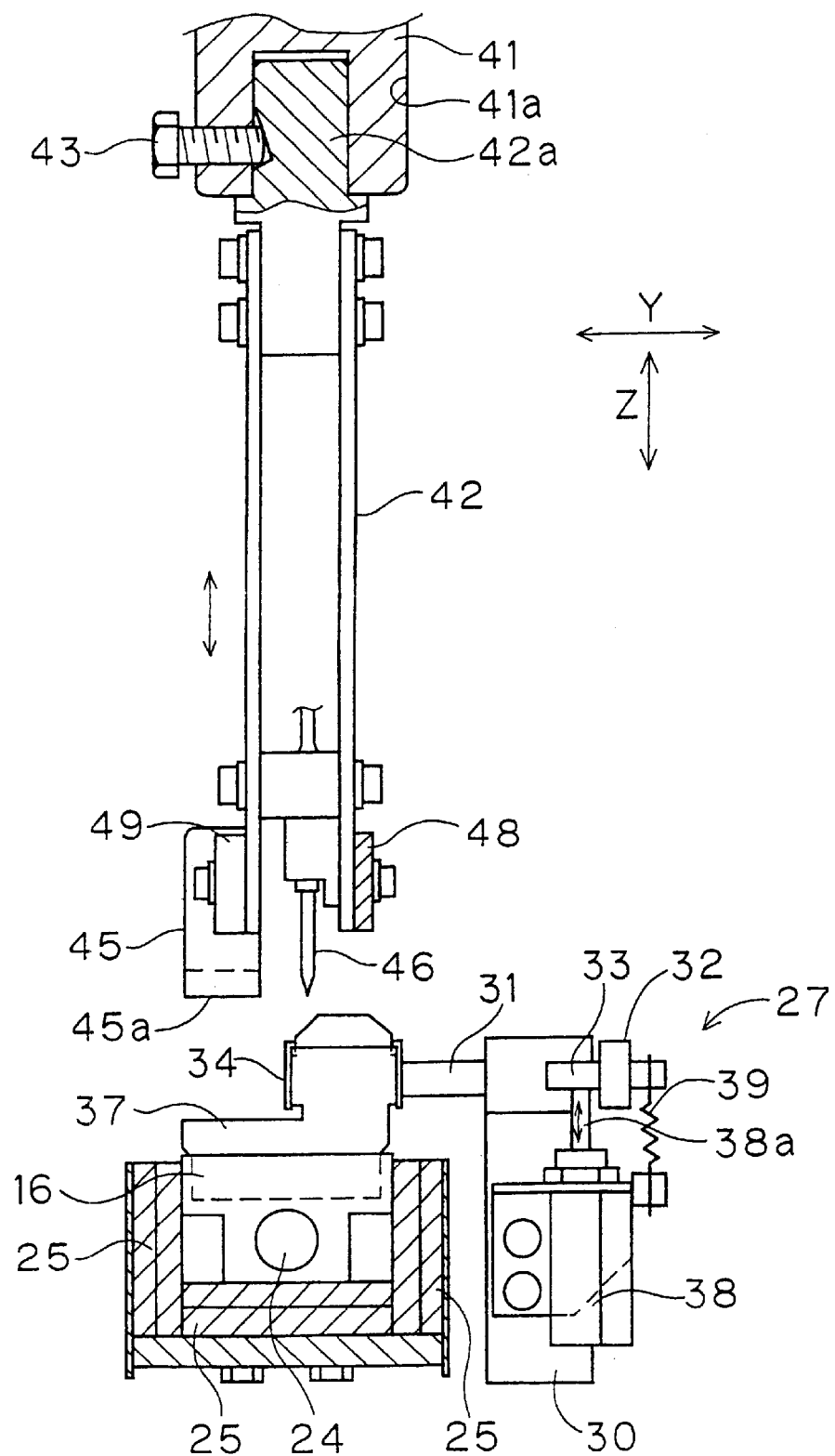
FIGS. 4 and 5 are side views, partially on an enlarged scale, of FIG. 2.

As depicted in FIG. 4, a return spring 39 which is a tension spring is mounted between the locating pin 33 and the support block 30 to urge the locating pin 33 under tension in a direction of the abutment with the forward end of the piston rod 38a.

For removal of the oxide film of the solder 22 formed on the surface of the solder 22, the piston rod 38a of the pivoting cylinder 38 is extended to push the locating pin 33 upwardly. As the locating pin 33 moves upwardly, the shaft 31 rotates to upwardly rotate the plate support 34 and the film removal plate 37 integrally about the axis of the shaft 31, as shown in phantom lines in FIG. 7.

With the plate support 34 and the film removal plate 37 in the upwardly rotated position, the piston rod 29a of the sliding cylinder 29 is extended to move the plate support 34 and the film removal plate 37 to over the surface of the solder 22 in the solder bath 16.

As the piston rod 38a of the pivoting cylinder 38 is retracted with the piston rod 29a in its extended position, the locating pin 33 is moved downwardly by the tensile force of the return spring 39. Thus, the plate support 34 and the film removal plate 37 are returned to the initial state in which the film removal plate 37 is in the vertical position, as shown in phantom lines in FIG. 7. At this time, the bottom part of the film removal plate 37 slightly penetrates into the surface of the solder 22.

Thereafter, as the piston rod 29a of the sliding cylinder 29 is retracted, the film removal plate 37 is moved along the surface of the solder 22 and is then returned to its initial position over the dross receiver 23. The oxide film removed by the film removal plate 37 is dropped off into the dross receiver 23. The process of removing the oxide film is thus completed. The process of removing the oxide film of the solder 22 is controlled to be automatically performed each time a predetermined time period has been elapsed.

The lower unit 7b is constructed so that the basal plate 17 is removably installed on a predetermined placement section 13a of the pedestal 13. Also in the rear solder depositing unit 8, the lower unit 7b is constructed so that the basal plate 17 is removably installed on a predetermined placement section 13 a.

The upper unit 7a is an elevating section moved upwardly and downwardly by an elevating means including a press mechanism, a hydraulic cylinder or the like, e.g. a press mechanism 40.

Figure 5:
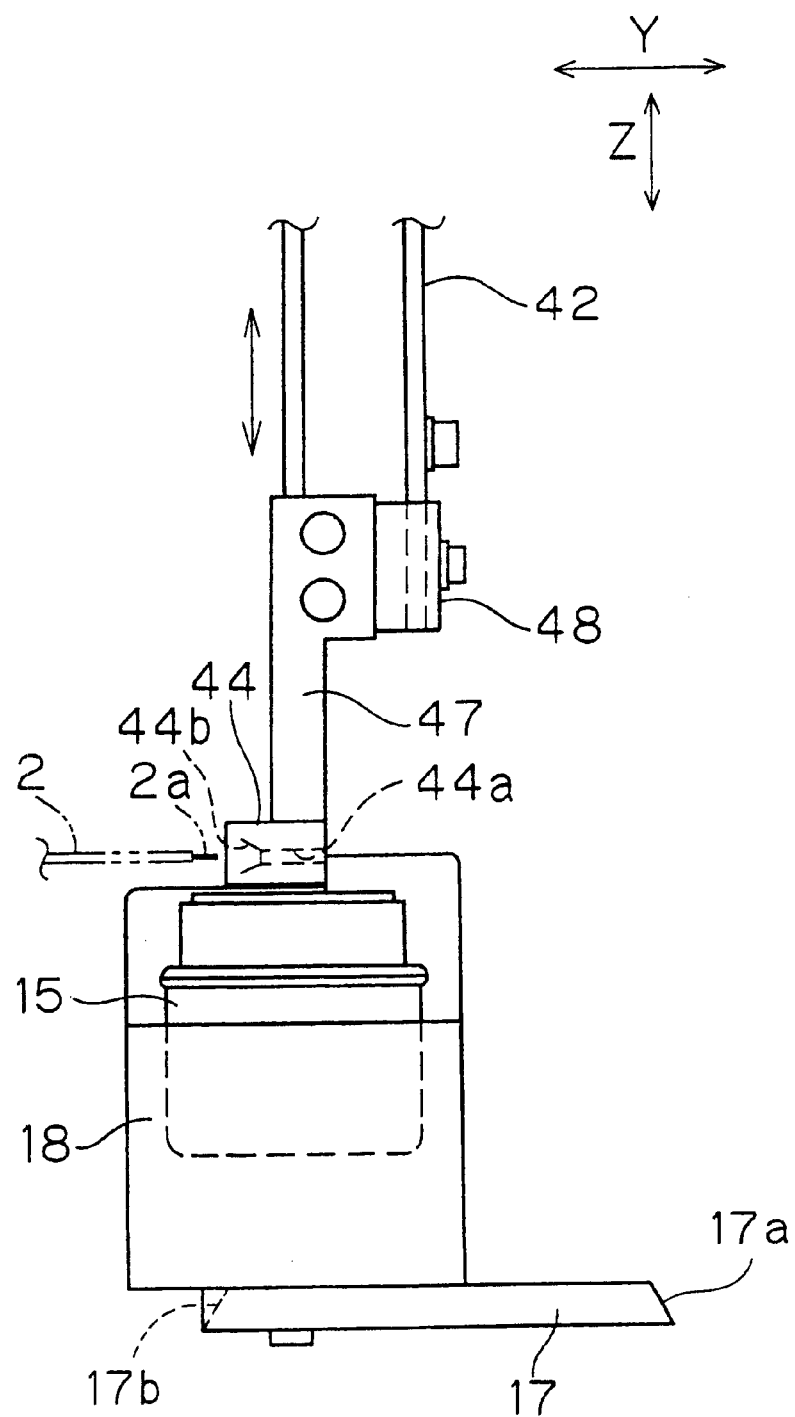

As shown in FIGS. 2, 4 and 5, the upper unit 7a comprises a support rod 42 with a mounting shaft portion 42a fitted in a mounting hole 41a formed in a lower end portion of a ram 41 moved up and down in the press mechanism 40 and removably mounted therein by tightening a bolt 43. The upper unit 7a further comprises a flux liquid holding tube 44, a wire presser guide 45, and a pair of probes 46 serving as electrodes, all of which are removably mounted to the lower end of the support rod 42.

Figure 8:
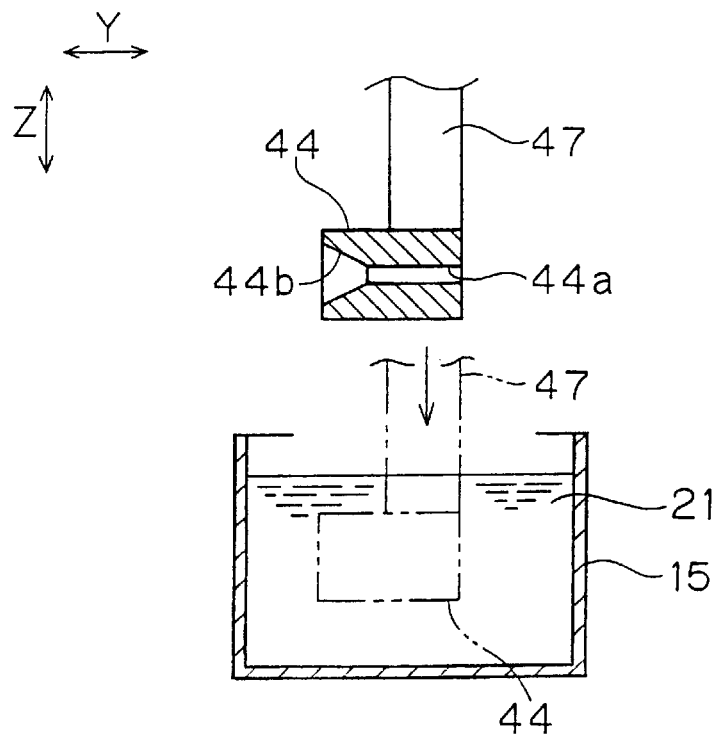
FIGS. 8 and 9 are views for illustrating a flux applying process.
Figure 9:
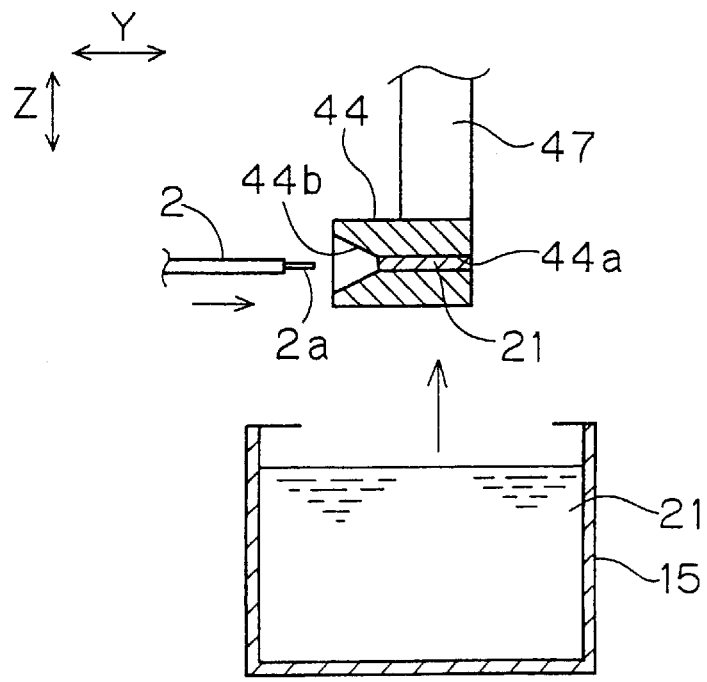

As illustrated also in FIGS. 8 and 9, the flux liquid holding tube 44 has a small-diameter holding hole 44a capable of receiving the core 2a of the wire 2 along the axis of a block having the shape of a rectangular prism. One end of the holding hole 44a for insertion of the core 2a of the wire 2 therefrom has a tapered insertion guide surface 44b which is gradually flared outwardly.

With the holding hole 44a in a horizontal position, one outer side surface of the flux liquid holding tube 44 is secured to the lower end of a support plate 47. The upper end of the support plate 47 is mounted to the bottom end of the support rod 42 by a support bracket 48 so that the flux liquid holding tube 44 is positioned over the flux bath 15.

For applying the flux liquid 21 to the core 2a of the wire 2, the downward movement of the support rod 42 resulting from the downward movement (in the Z direction) of the ram 41 causes the flux liquid holding tube 44 to be immersed into the flux liquid 21 in the flux bath 15, as shown in phantom lines in FIG. 8.

Then, the upward movement of the support rod 42 resulting from the upward movement of the ram 41 causes the flux liquid holding tube 44 to return to its initial position over the flux liquid 21 in the flux bath 15, as shown in phantom lines in FIG. 9. In this process, the holding hole 44a of the flux liquid holding tube 44 is filled with the flux liquid 21 to hold the flux liquid 21 therein.

The wire 2 gripped by the front clamp 4 so as to lie on an extension of the axis of the holding hole 44a in the position of the flux bath 15 is moved forward (in the Y direction) by the actuation of the front moving means 9, and the core 2a exposed on the wire end is inserted into the holding hole 44a. The insertion of the core 2a into the holding hole 44a causes the flux liquid 21 to be applied to the core 2a.

Thereafter, the front moving means 9 moves backward to draw the core 2a out of the holding hole 44a. This completes the flux applying process. The flux bath 15, the flux liquid holding tube 44, the front moving means 9 and the like constitute a flux applying device.

The wire presser guide 45 has a structure such that an elongated rectangular plate material is bent into a substantially L-shaped configuration, as shown in FIGS. 2 and 4.

The upper end of the wire presser guide 45 is mounted to the lower end of the support rod 42 by a support bracket 49 so that a presser surface 45*a* on the lower end of the wire presser guide 45 assumes a horizontal position and is positioned over the solder bath 16.

Figure 10:
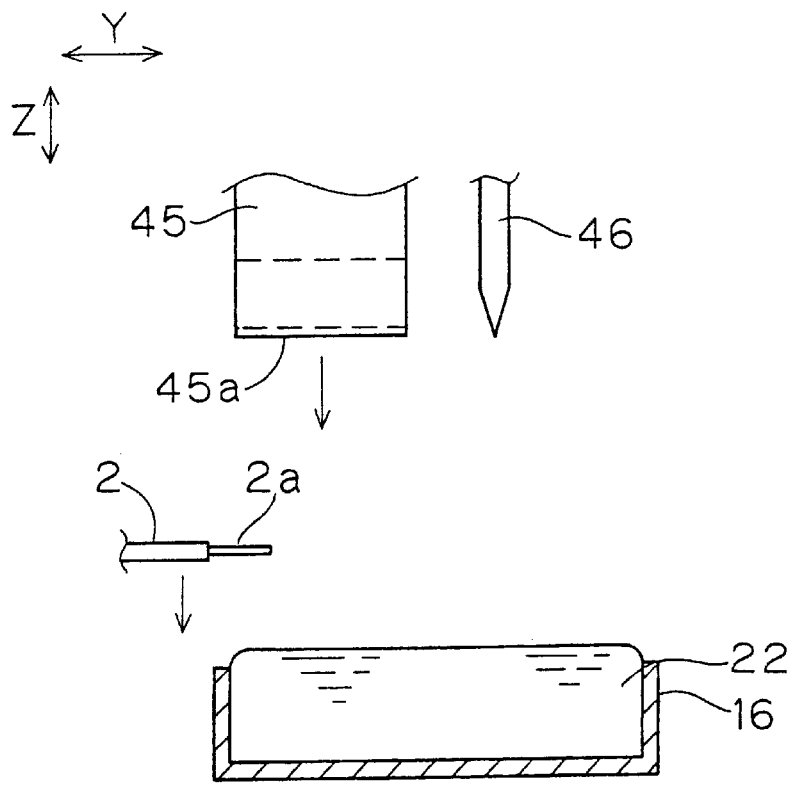
FIGS. 10 through 12 are views for illustrating a solder depositing process.
Figure 11:
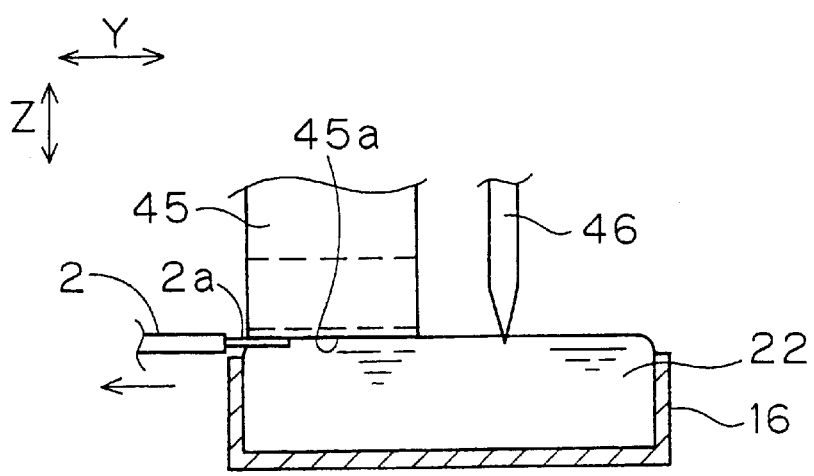

For depositing the solder 22 onto the core 2*a* of the wire 2, the wire 2 gripped by the front clamp 4 in the position of the solder bath 16 so that the core 2*a* is positioned between the surface of the solder 22 in the solder bath 16 and the presser surface 45*a* of the wire presser guide 45, as shown in FIG. 10, is moved downwardly (in the Z direction) by the actuation of the front moving means 9, and the core 2*a* is immersed in a solder portion upwardly bulged by the surface tension of the solder 22, as shown in FIG. 11.

Thereafter, the downward movement of the support rod 42 resulting from the downward movement of the ram 41 causes the presser surface 45*a* of the wire presser guide 45 to press the core 2*a* downwardly into the solder 22.

Figure 12:
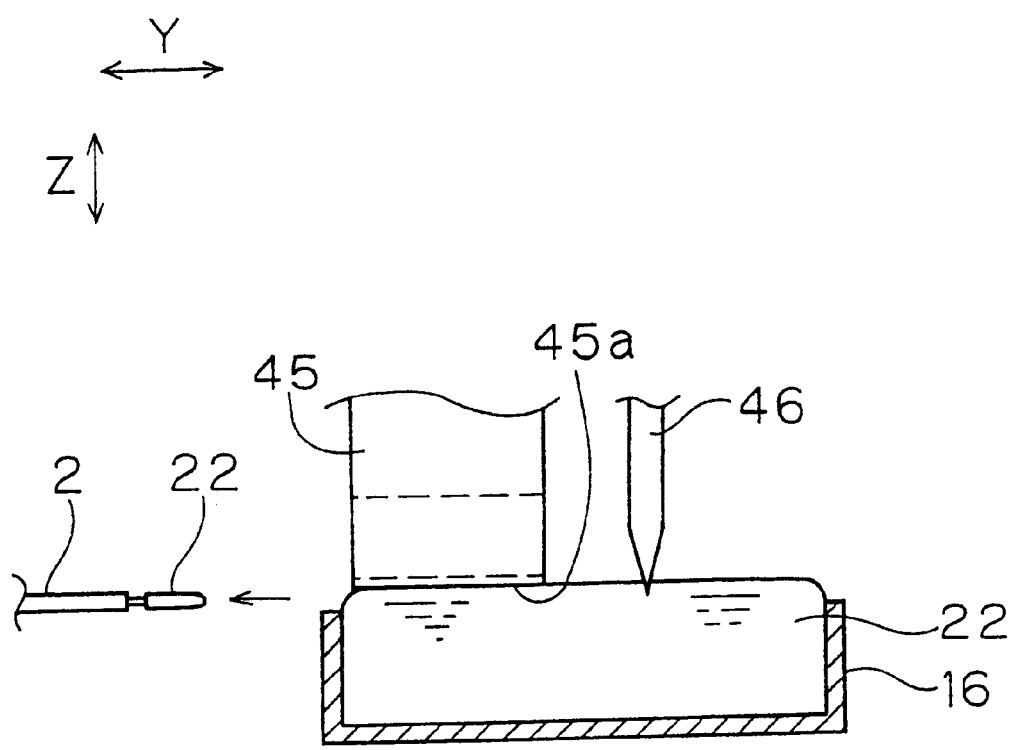

In this state, as shown in FIG. 12, when the front moving means 9 moves backward (in the Y direction) to draw the wire 2 out of the solder 22 in the solder bath 16, the core 2*a* with the solder 22 deposited thereon is obtained. The upward movement of the support rod 42 resulting from the upward movement of the ram 41 causes the wire presser guide 45 to return to its initial position, as shown in FIG. 10. This completes the solder depositing process. The solder bath 16, the wire presser guide 45, the front moving means 9 and the like constitute a solder depositing device.

The upward and downward movements of the ram 41 during the solder depositing process also move the flux liquid holding tube 44 upwardly and downwardly as mentioned above, and the holding hole 44*a* of the flux liquid holding tube 44 is filled with the flux liquid 21 in the flux applying process for the core 2*a* of the next wire 2.

The pair of probes 46 are mounted to and supported by a support block 50 so as to have respective vertical axes and be spaced a predetermined distance apart from each other in side-by-side relation, as shown in FIGS. 2 and 4. The lower ends of the respective probes 46 are approximately level with the presser surface 45*a* of the wire presser guide 45. The support block 50 is mounted to the lower end of the support rod 42 by the support bracket 48 so that the pair of probes 46 are positioned over the solder bath 16.

The probes 46 are configured to be immersed in the solder 22 in the solder depositing process when the presser surface 45*a* of the wire presser guide 45 moved downwardly comes into contact with the surface of the solder 22, as shown in FIGS. 11 and 12.

Figure 13:
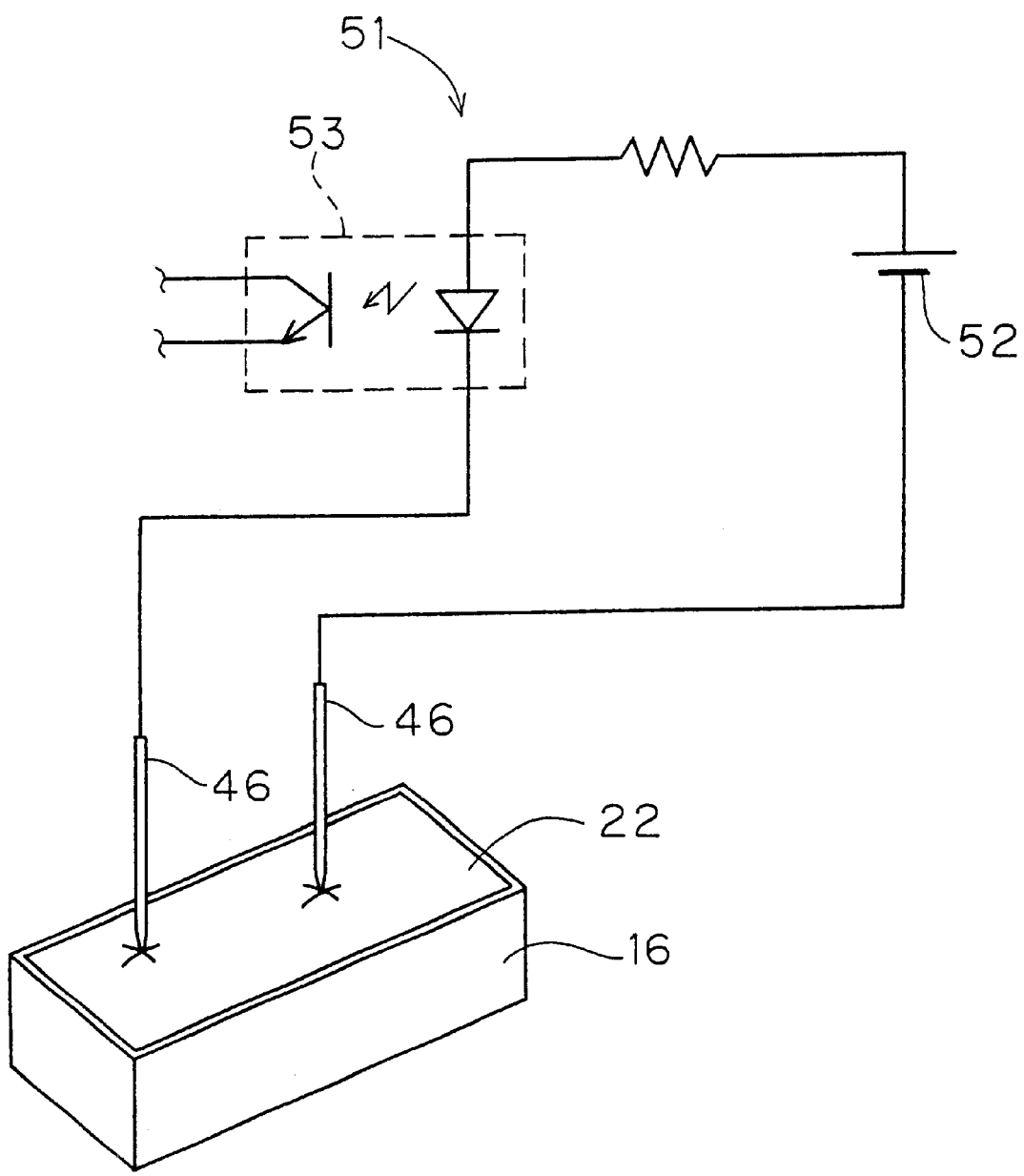
FIG. 13 illustrates a detector circuit.

As illustrated in FIG. 13, the pair of probes 46 are connected to a detector circuit 51 which comprises a power supply 52, a photocoupler 53 and the like.

The position of the surface of the solder 22 is detected in a manner to be described below. If the pair of probes 46 are in contact with the surface of the solder 22 as shown in FIGS. 13 and 14 in the solder depositing process when the presser surface 45*a* of the wire presser guide 45 moved downwardly comes into contact with the liquid surface of the solder 22, a closed circuit is formed in the detector circuit 51 through the solder 22 which is an electrically conductive material, and the photocoupler 53 having a diode outputs a surface detection signal to a controller not shown in response to light emitted from the diode.

Figure 14:
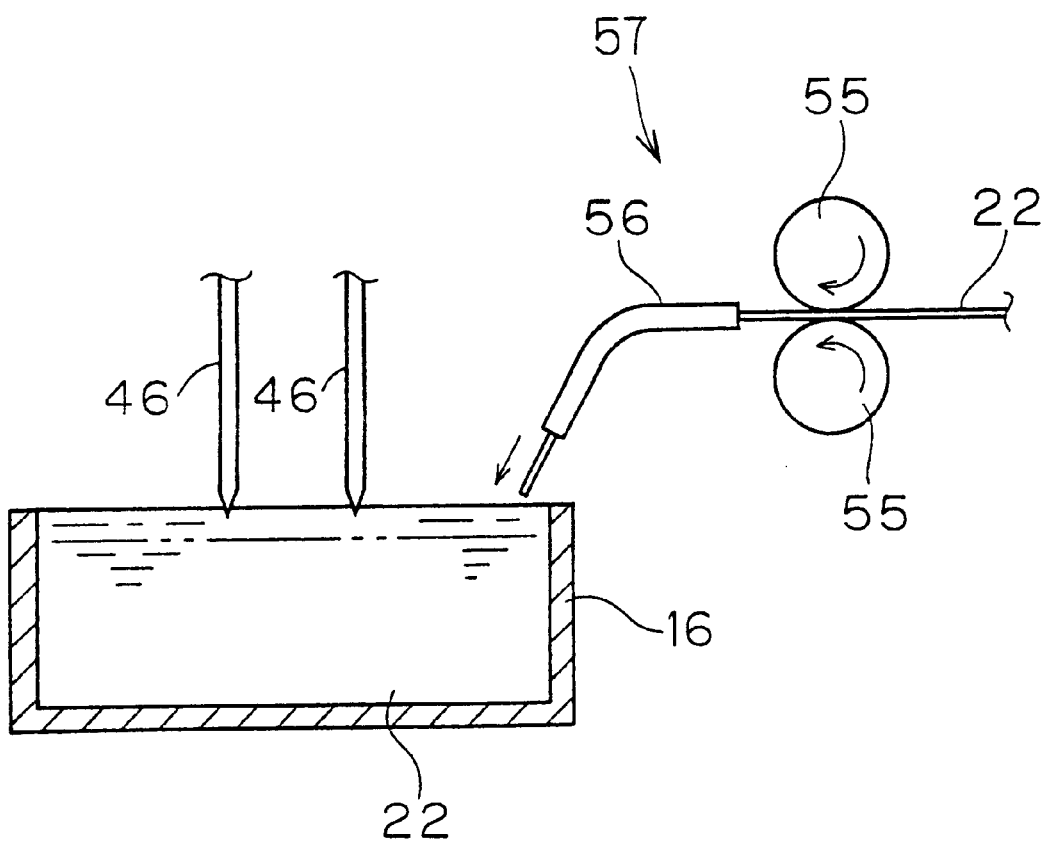
FIG. 14 is a view for illustrating the replenishment of solder.

In this process, if the pair of probes 46 are out of contact with the surface of the solder 22 because the reduction in the amount of solder 22 lowers the surface of the solder as shown in phantom line in FIG. 14, the closed circuit is not formed in the detector circuit 51 and the diode in the photocoupler 53 does not emit light. Thus, the surface detection signal is not outputted to the controller. Then, the controller judges that the amount of solder 22 is insufficient, and exercises control to replenish the solder 22.

The solder replenishing control is performed, for example, in such a manner that a pair of supply rollers 55 for holding solder 22 having the shape of a thread therebetween rotate intermittently to feed the thread-shaped solder 22 through a guide pipe 56 into the solder bath 16. The thread-shaped solder 22 fed into the solder bath 16 is heated by the heater 24 into a molten state. The thread-shaped solder 22, the supply rollers 55, the guide pipe 56 and the like constitute a solder replenishing means 57.

The position of the surface of the solder 22 detected by the pair of probes 46 may be previously set at an appropriate position which allows a necessary amount of solder 22 to be deposited onto the core 2*a* of the wire 2. The solder replenishing means 57 may be mounted in an appropriate position on the pedestal 13.

The rear solder depositing unit 8 is similar in construction to the front solder depositing unit 7. A similar solder depositing process is performed in the rear solder depositing unit 8.

In this preferred embodiment, the solder depositing units 7, 8 installed on the respective placement sections 13*a* and an applicator 60 serving as a contact crimping unit constituting the wire processing unit are interchangeable with each other.

Figure 15:
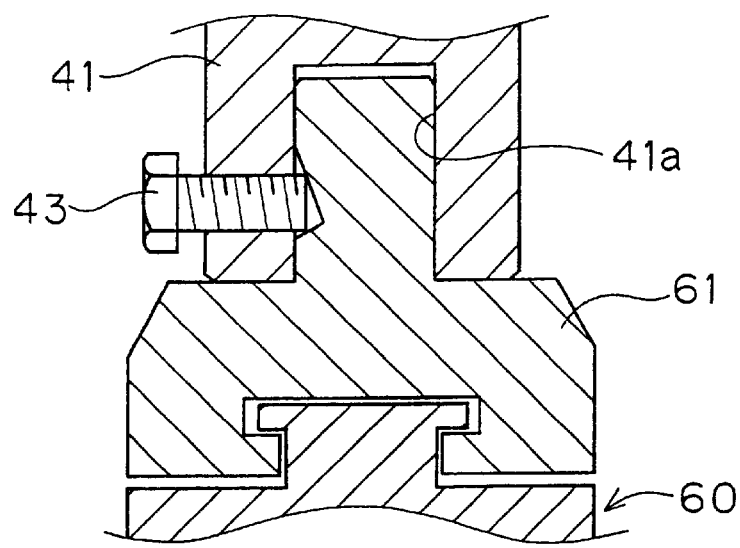
FIG. 15 is a sectional view showing a structure for coupling a ram and an applicator.

The support rod 42 is removable by loosening the bolt 43 and pulling the mounting shaft portion 42*a* out of the mounting hole 41*a* of the ram 41. For coupling the ram 41 and the applicator 60 together, as shown in FIG. 15, a coupling member 61 for coupling the applicator 60 is similarly mounted to the ram 41, and a head portion serving as an elevating section of the applicator 60 and the ram 41 are coupled to each other by the coupling member 61. This coupling structure is substantially similar to a conventional coupling structure of the applicator 60 and the ram 41 of the press mechanism 40.

Figure 16:
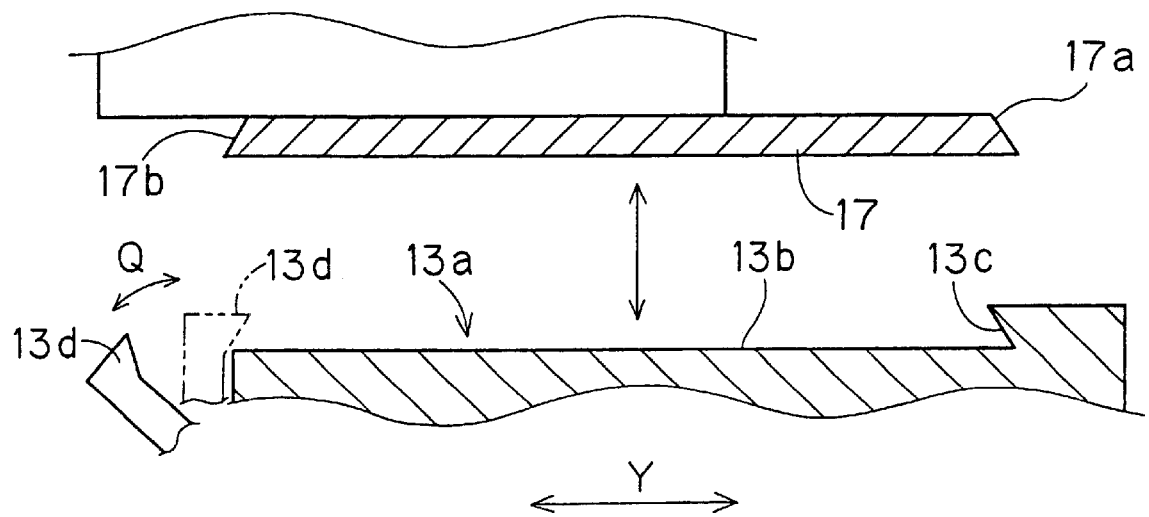
FIG. 16 is a view for illustrating a structure for mounting a basal plate to a placement section.

A structure for removably coupling the applicator 60 to the placement section 13*a* of the pedestal 13 is also substantially similar to a conventional coupling structure, and the present invention uses this technique for a coupling structure of the lower unit 7*b* and the pedestal 13. With reference to FIGS. 5 and 16, the basal plate 17 in the lower unit 7*b* has wedged locking portions 17*a* and 17*b* on opposite end edges thereof. A base portion 13*b* of the placement section 13*a* is provided with engagement lugs 13*c*, 13*d* opposed to each other for detachably engaging the locking portions 17*a*, 17*b* to locate and fix the lower unit 7*b* on the placement section 13*a*. The engagement lug 13*d* is movable as indicated by the arrow Q in FIG. 16.

The lower unit 7*b* is installed in a manner to be described below. With the lower unit 7*b* placed on the placement section 13*a*, the engagement lug 13*d* is raised up into a locking position shown in phantom lines in FIG. 16 to lock the locking portion 17*b* into engagement, whereby the lower unit 7*b* is located and fixed on the placement section 13*a*. For removal of the lower unit 7*b*, the engagement lug 13*d* is unlocked and brought down to disengage from the locking portion 17*b*, thereby permitting the removal of the lower unit 7*b*.

When the wire processing apparatus 1 performs the solder depositing process, the solder depositing unit 7 is installed on the placement section 13*a*, and an operating mode is a solder depositing mode. When the wire processing apparatus 1 performs the contact crimping process, the applicator 60 is installed on the placement section 13a, and the operating mode is changed to a contact crimping mode.

When the applicator 60 is installed on the placement section 13a, there is provided a contact feed mechanism (not shown) or the like as a component necessary for the contact crimping process. The contact feed mechanism is driven by at least the press mechanism 40 to unreel crimp contacts (not shown) attached in the form of a chain from a contact reel, thereby feeding the crimp contacts to a crimping section of the applicator 60 for crimping the contacts. Thus, the wire processing apparatus 1 can successively manufacture harnesses with contacts crimped onto their opposite ends in a similar manner to the conventional contact crimping device.

Figure 17:
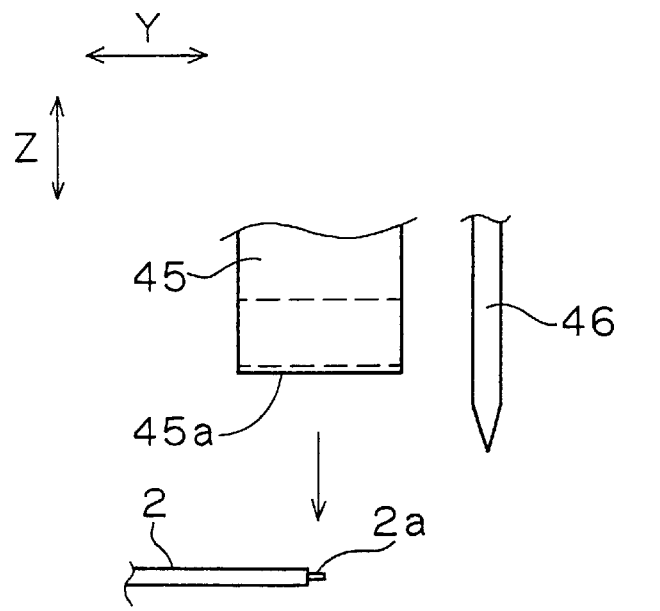
FIGS. 17 through 19 are views for illustrating the solder depositing process.
Figure 18:
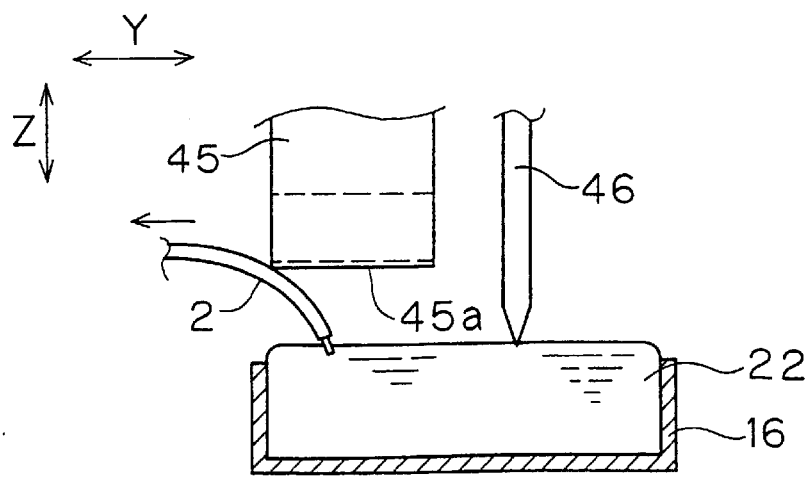

The wire processing apparatus 1 performs the solder depositing process in a manner to be described below when depositing the solder 22 onto the exposed core 2a of a short length on the end of the wire 2. As shown in FIG. 17, the wire 2 subjected to the flux applying process as mentioned above is supported by the front moving means 9 in the position of the solder bath 16 so that the core 2a is positioned over the solder bath 16. In this state, the ram 41 is moved a predetermined distance downwardly. The presser surface 45a of the wire presser guide 45 presses the wire 2 downwardly to immerse the core 2a into the solder 22, as shown in FIG. 18. In this process, the vertical position of the pair of probes 46 is adjusted as needed so that the probes 46 contact the solder 22.

Figure 19:
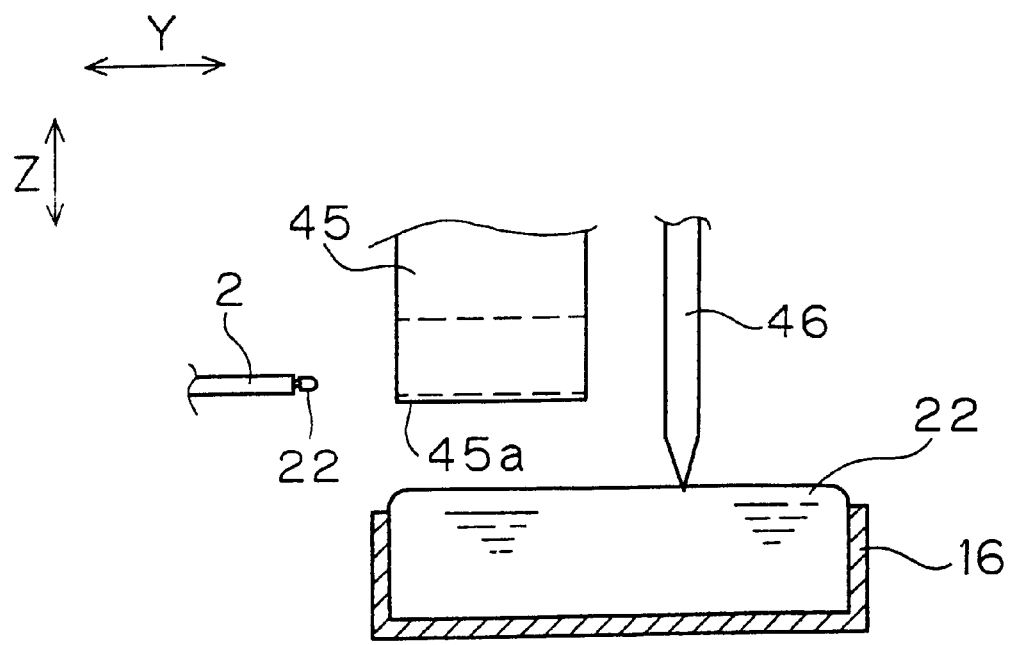

Thereafter, when the front moving means 9 in this state moves backward to draw the wire 2 out of the solder 22 in the solder bath 16, the core 2a with the solder 22 deposited thereon is obtained, as shown in FIG. 19. The upward movement of the support rod 42 resulting from the upward movement of the ram 41 causes the wire presser guide 45 to return to its initial position, as shown in FIG. 10. The wire processing apparatus 1 is controlled so that the solder depositing process is completed at this time.

The preferred embodiment according to the present invention is constructed as discussed above, and adopts the technique in which the flux liquid 21 is applied to the core 2a by inserting the core 2a into the holding hole 44a of the flux liquid holding tube 44 moved up and down between a raised position lying over the flux bath 15 and a lowered position lying in the flux liquid 21. The flux bath 15 is only required to have a container structure capable of storing the flux liquid 21 therein.

Thus, the preferred embodiment according to the present invention eliminates the need to provide the conventional flux liquid circulation structure and the conventional insertion hole in the side wall of the flux bath, thereby to achieve a simplified structure of the flux bath 15, effective prevention of liquid leakage, and size reduction of the flux bath 15 itself. Since the end of the holding hole 44a has the tapered insertion guide surface 44b gradually flared outwardly, the guide function of the insertion guide surface 44b allows the stable insertion of the core 2a into the holding hole 44a.

The preferred embodiment according to the present invention also adopts the technique in which the solder 22 is deposited onto the core 2a by moving the wire 2 downwardly and immersing the core 2a in the solder portion raised by surface tension of the solder 22 stored in the solder bath 16. The solder bath 16 is only required to have a container structure capable of storing the solder 22 in a molten state therein. This eliminates the need to provide the conventional solder flowing structure, thereby to achieve a simplified structure of the solder bath 16 and the size reduction thereof.

The presser surface 45a of the wire presser guide 45 downwardly presses the core 2a immersed in the solder portion raised by surface tension of the solder 22, and the core 2a in this state is drawn out of the raised portion, whereby the solder is deposited on the core 2a. This provides the solder 22 deposited in a better state on the core 2a.

Further, the film removal mechanism 27 removes the oxide film formed on the surface of the solder 22 to hold the surface of the solder 22 in the solder bath 16 in a good state. Therefore, the solder 22 is applied to the core 2a in a constantly good state.

The detector circuit 51 serving as a surface detection means for detecting the position of the surface of the solder 22 stored in the solder bath 16 may employ a so-called switch circuit in which a closed circuit is formed by contact with the surface of the solder 22. This eliminates the need to provide a costly thermocouple, a complicated temperature-detecting analog circuit and the like, thereby to provide a method of detecting the surface position of the solder 22 with a simplified structure at low costs.

Moreover, the probes 46 which are vertically movable have the advantage of effectively preventing the oxide film of the solder 22 from being deposited on the probes 46, as compared with the probes always immersed in the surface of the solder 22.

Furthermore, the solder depositing units 7, 8 and the applicator 60 which are removable from the placement section 13a and interchangeable with each other may be interchanged and used as required depending on circumstances. This eliminates the need to individually provide both the double-end wire terminating machine and the single-end wire solder-depositing and terminating machine as in the background art, thereby to achieve the reduction in installation space and in the size of the entire wire processing apparatus 1.

Since the flux bath 15 and the solder bath 16 are reduced in size as discussed above, the preferred embodiment according to the present invention achieves the size reduction of the entire solder depositing units 7 and 8. The applicator 60 and its occupied space for installation are not much different from those of the background art. In this respect, further size reduction of the wire processing apparatus 1 is accomplished.

Additionally, the support rod 42 supports the flux liquid holding tube 44 and the wire presser guide 45, and the vertical movement of the support rod 42 resulting from the vertical movement of the ram 41 causes the flux liquid holding tube 44 and the wire presser guide 45 to integrally move up and down. Thus, after the completion of the solder depositing process performed on the core 2a by the wire presser guide 45, the holding hole 44a of the flux liquid holding tube 44 is filled with the flux liquid 21 for the next core 2a. This achieves efficient manufacture of harnesses to improve operation efficiency.

While the invention has been described in detail, the foregoing description is in all aspects illustrative and not restrictive. It is understood that numerous other modifications and variations can be devised without departing from the scope of the invention.

What is claimed is:

1. A wire processing apparatus comprising:
   moving means for moving a wire; and
   a wire processing unit installed on a placement section for performing processing on an end of said wire moved by said moving means, said wire processing unit including a contact crimping unit for crimping a crimp contact onto said end of said wire, and a solder depositing unit for depositing solder onto an exposed core on said end of said wire, wherein said contact crimping unit and said solder depositing unit are attachable to and removable from said placement section, and are exchangeable with each other.

2. The wire processing apparatus according to claim 1, wherein each of said contact crimping unit and said solder depositing unit comprises an elevating section, said wire processing apparatus further comprising elevating means for upwardly and downwardly moving said elevating section of one of said contact crimping unit and said solder depositing unit which is installed on said placement section.

3. The wire processing apparatus according to claim 2, wherein said elevating means includes a press mechanism.

4. The wire processing apparatus according to claim 2, wherein said solder depositing unit comprises a solder bath for storing therein solder in a molten state to be deposited on said core; and wherein said moving means moves downwardly to immerse said core in a solder portion raised by surface tension of said solder stored in said solder bath, whereby said solder is deposited on said core.

5. The wire processing apparatus according to claim 4, wherein said elevating section of said solder depositing unit comprises a wire presser guide positioned over said solder bath in which said core is to be immersed, said wire presser guide having a presser surface for moving downwardly to downwardly press said core immersed in said solder portion raised by the surface tension of said solder; and wherein said moving means moves backward to draw said core pressed by said presser surface out of said raised solder portion, whereby said solder is deposited on said core.

6. The wire processing apparatus according to claim 4, wherein said solder depositing unit comprises a flux bath for storing therein a flux liquid to be applied to said core; and wherein said elevating section of said solder depositing unit comprises a flux liquid holding tube supported by said elevating section of said solder depositing unit vertically movable between a raised position lying over said flux bath and a lowered position lying in said flux liquid, said flux liquid holding tube having a holding hole for holding said flux liquid therein and capable of releasably receiving said core therein.

7. The wire processing apparatus according to claim 5, wherein said solder depositing unit comprises a flux bath for storing therein a flux liquid to be applied to said core; and wherein said elevating section of said solder depositing unit comprises a flux liquid holding tube supported by said elevating section of said solder depositing unit vertically movable between a raised position lying over said flux bath and a lowered position lying in said flux liquid, said flux liquid holding tube having a holding hole for holding said flux liquid therein and capable of releasably receiving said core therein.

8. The wire processing apparatus according to claim 7, wherein an end of said holding hole of said flux liquid holding tube for insertion of said core therefrom has a tapered insertion guide surface gradually flared outwardly.

9. The wire processing apparatus according to claim 8, wherein said elevating section of said solder depositing unit further comprises a support rod having a lower end for supporting said flux liquid holding tube and said wire presser guide;

wherein, when said support rod is in a raised position, said flux liquid holding tube is in said raised position lying over said flux bath, and said wire presser guide is positioned over said solder bath with said core immersed in said solder portion raised by the surface tension of said solder; and wherein, when said support rod is in a lowered position, said flux liquid holding tube is in said lowered position lying in said flux liquid, and said presser surface of said wire presser guide downwardly presses said core immersed in said solder portion raised by the surface tension of said solder.

10. The wire processing apparatus according to claim 9, wherein said solder depositing unit further comprises a film removal mechanism for removing an oxide film formed on a surface of said solder stored in said solder bath.

11. A flux applying device for applying a flux liquid to an exposed core on an end of a wire, said flux applying device comprising:

a flux bath for storing said flux liquid therein;

a flux liquid holding tube supported vertically movable between a raised position lying over said flux bath and a lowered position lying in said flux liquid, said flux liquid holding tube having a holding hole for holding said flux liquid therein; and moving means for movably supporting said wire and for releasably inserting said core into said holding hole of said flux liquid holding tube lying in said raised position.

12. The flux applying device according to claim 11, wherein an end of said holding hole of said flux liquid holding tube for insertion of said core therefrom has a tapered insertion guide surface gradually flared outwardly.

13. A solder depositing device comprising:

a flux bath for storing therein a flux liquid to be applied to an exposed core on an end of a wire;

a solder bath for storing therein solder in a molten state to be deposited on said core;

moving means for supporting said wire, said moving means being movable so as to cause said flux liquid to be applied to said core in a position of said flux bath and to cause said solder to be deposited on said core in a position of said solder bath;

a support rod operated to move upwardly and downwardly;

a flux liquid holding tube supported by a lower end of said support rod vertically movable between a first raised position lying over said flux bath and a first lowered position lying in said flux liquid, said flux liquid holding tube having a holding hole for holding said flux liquid therein and capable of releasably receiving said core therein; and a wire presser guide having a presser surface, said wire presser guide being supported by the lower end of said support rod and positioned over said solder bath with said core immersed in a solder portion raised by surface tension of said solder when said support rod is in a second raised position in which said flux liquid holding tube is in said first raised position, said presser surface downwardly pressing said core immersed in said solder when said support rod is in a second lowered position in which said flux liquid holding tube is in said first lowered position.

14. A wire processing apparatus comprising:

moving means for moving a wire; and a wire processing unit installed on a placement section configured to perform processing on an end of the wire moved by the moving means, the wire processing unit comprising:
 a contact crimping unit configured to crimp a crimp contact onto the end of the wire; and
 a solder depositing unit configured to deposit solder onto an exposed core of the end of the wire,
 wherein the contact crimping unit and the solder depositing unit attachable to and removable from the placement section.

15. A flux applying device for applying a flux liquid to an exposed core of an end of a wire comprising:
 a flux bath configured to store the flux liquid therein;
 a flux liquid holding tube supported vertically movable between a raised position over the flux bath and a lowered position in the flux liquid, the flux liquid holding tube including a holding hole configured to hold the flux liquid therein; and
 moving means for movably supporting the wire and for releasably inserting the core into the holding hole of the flux liquid tube.

16. A solder depositing device comprising:
 a flux bath configured to store therein a flux liquid to be applied to an exposed core on an end of a wire;
 a solder bath configured to store therein solder in a molten state to be deposited on the core;
 moving means for supporting the wire, the moving means being movable to cause the flux liquid to be applied to the core in a position of the flux bath and to cause the solder to be deposited on the core in a position of the solder bath;
 a support rod operated to move upwardly and downwardly;
 a flux liquid holding tube supported by a lower end of the support rod vertically movable between a first raised position lying over the flux bath and a first lowered position lying in the flux liquid, the flux liquid holding tube having a holding hole adapted to hold the flux liquid therein and capable of releasably receiving the core therein; and
 a wire presser guide having a presser surface, the wire presser guide being supported by the lower end of the support rod and positioned over the solder bath with the core immersed in a solder portion raised by surface tension of the solder when the support rod is in a second raised position in which the flux liquid holding tube is in the first raised position, the presser surface downwardly pressing the core immersed in the solder when the support rod is in a second lowered position in which the flux liquid holding tube is in the first lowered position.

* * * * *